Nov. 25, 1941.   C. C. HARLE   2,263,949
BRAKE
Filed Aug. 3, 1940

INVENTOR
Carl C. Harle
BY John P. Tarbox
ATTORNEY

Patented Nov. 25, 1941

2,263,949

UNITED STATES PATENT OFFICE 2,263,949

BRAKE

Carl Christian Harle, Detroit, Mich., assignor to Budd Wheel Company, Philadelphia, Pa., a corporation of Pennsylvania Application August 3, 1940, Serial No. 350,200

7 Claims. (Cl. 188—78)

The invention relates to brakes, and more particularly to the internal expanding shoe type of brakes.

It is an object of the invention to provide simple and inexpensive means for holding the shoes against movements which would ordinarily result in noise or rattle, and further to provide such means which can be readily assembled or disassembled.

Such means may comprise a simple leaf spring or springs, one for each shoe, in the case of a two-shoe brake, and a single attaching bolt associated with each spring, which can be readily assembled with the spring to place it under tension to hold the shoe against the backing plate.

Other and further objects and advantages and the manner in which they are attained will become apparent from the following detailed description when read in connection with the drawing forming a part hereof.

Figure 1:
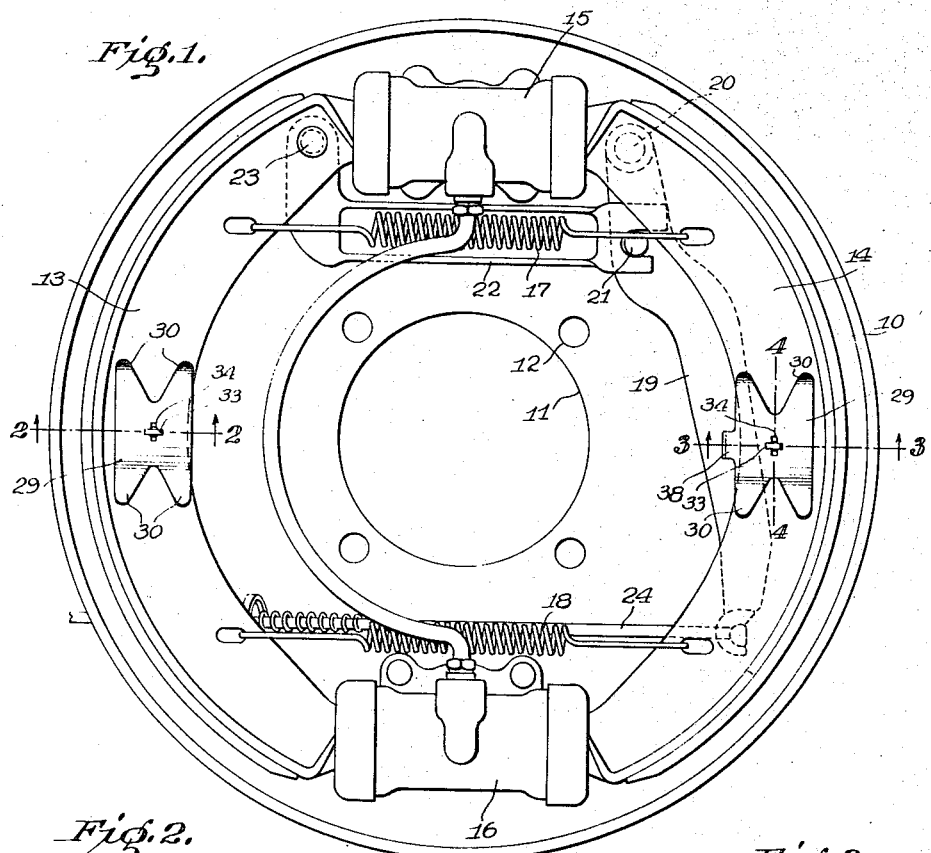
Fig. 1 is a side elevation of a brake shoe and backing plate assembly showing the invention applied thereto.

In the embodiment of the invention selected for illustration, the brake shoes, their actuating means and the backing plate closing the otherwise open side of the drum are first subassembled and then secured as a unit on a fixed part, as the axle housing, and in cooperative relation with the rotating drum.

The backing plate 10 is shown provided with a central opening 11 around which are arranged a series of equally spaced bolt holes 12 through which the assembly is bolted to the axle housing. The shoes 13 and 14 are shown symmetrically arranged on opposite sides of a vertical plane and are interchangeable. Fluid cylinder actuators 15 and 16 are secured to the backing plate arranged one between each pair of adjacent shoe ends. The shoes are held in release position with their ends in engagement with the actuators by springs 17 and 18. An emergency means for actuating the shoes is provided in the lever 19 pivoted to shoe 14 at 20 and having intermediate its ends a pin 21 having a lost-motion connection with a link 22 pivoted at 23 to the shoe 13. An actuating cable 24 is connected to the end of the lever 19 remote from its pivot 20.

It will thus be seen that the shoes may be moved radially into braking engagement with the drum against the action of the springs 17 and 18 either by introducing fluid under pressure between pistons (not shown) in the fluid actuators 15 and 16 or by actuating the cable 24.

Figure 2:
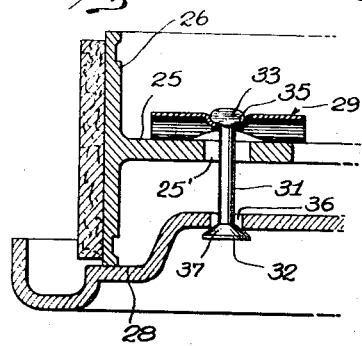
Figs. 2, 3 and 4 are detail sectional views taken on the correspondingly numbered section lines of Fig. 1, showing the parts on an enlarged scale.
Figure 3:
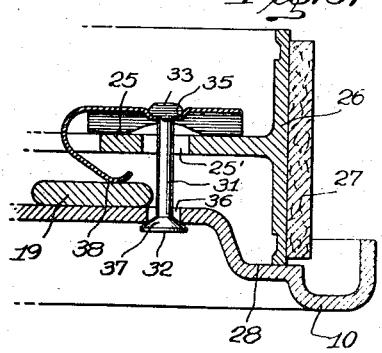

The shoes may be of the usual T-section form, as shown in Figs. 2 and 3, having a web portion 25 generally paralleling the backing plate but spaced therefrom and a face portion 26, the latter being shown lined by a suitable brake lining 27.

In the radial on and off movements of the shoes, they slide in contact with an annular radial face 28 on the backing plate, and they are held against this face continuously to avoid rattle by the novel spring means of the invention.

Figure 4:
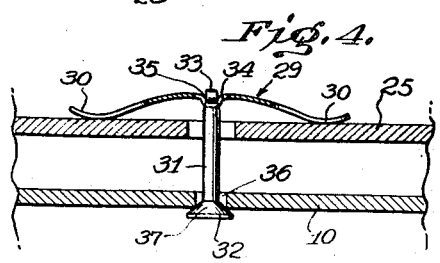

As shown in Figs. 2 and 4, such means may comprise a simple leaf spring 29 of generally H shape, and having its central portion bowed away from the web 25 of the shoe so that it has four spring arms 30 engaging the web at spaced points. This spring is arranged at the central portion of the shoe, two arms bearing on the shoe at each side of its center to firmly press the entire shoe against the backing plate.

Simple means are provided to secure the spring in place under tension. Such means may comprise a bolt 31 having a headed portion at each end, the head 32 at the outer end being larger than the head 33 at the inner end. The spring 29 has its central portion provided with a hole for the passage of the stem of the bolt and this hole is widened in one direction by a slot 34 which permits the passage of the narrow elongated head 33. At an angle to this slot, a right angle as shown, the spring is formed with a groove 35 to receive the elongated head and prevent turning thereof in assembly. The web 25 of the shoe is provided with an opening 25' for the passage of the bolt and permitting the required movement of the shoe without striking the bolt.

Preferably the ends of the spring arms 30 are slightly upturned, as shown in Fig. 4, to avoid digging into the metal of the shoe.

This spring 29 and its securing and tensioning means 31 are very readily assembled with the backing plate and shoe in the manner now to be described.

When the shoe is assembled with the actuators on the backing plate, its opening 25' is aligned with an opening 36 in the backing plate, the latter being smaller than the head 32 but large enough to permit the passage of head 33 of bolt 31. The spring 29 is then brought into position with the hole in the center of slot 34 aligned with the openings 25' and 36. The bolt 31 is then inserted until its head 33 enters the slot 34 and held in this position by pressing with one hand against the head 32. The outwardly bowed center of the spring is then depressed by the other hand of the operator until the head 33 is free of the slot 34, and the bolt is then turned to align the groove 35 with the head 33, and the spring then allowed to expand and cause the head 33 to seat in the groove.

Preferably the head 32 has its inner face formed with a conical or ball face 37 so that the bolt can tilt readily with the movement of the shoe to braking or release positions without necessitating the sliding of the spring arms 30 across the web of the shoe.

The description so far has been directed more particularly to the form of spring used with the left hand shoe 13. The right hand spring (Fig. 3) is similar but modified slightly from the one described by providing the radially inner side thereof with a return bent spring arm extension 38. This extension serves the function of pressing against the adjacent side of lever 19 to hold its opposite face against the backing plate and thus prevent it from rattling movement. Where no such emergency brake lever is employed, it will be understood that the springs for both shoes would be identical.

While a preferred specific embodiment of the invention has been described herein, it will be understood that changes may be made from this embodiment which would readily occur to those skilled in the art, and such changes are intended to be included within the spirit and scope of the claims appended hereto.

What is claimed is:

1. A brake mechanism comprising a backing plate having a radial face, a brake shoe seated against said face for radial movement thereacross from braking to release position and vice versa, said shoe having a radial web spaced from the backing plate, and means engaging said web and backing plate to resiliently hold said brake shoe against its seat on the backing plate, said resilient holding means comprising a centrally arched leaf spring having its ends engage the side of the web of the shoe remote from the backing plate, and a single unitary securing bolt for said spring having integral heads at its opposite ends, an opening in the backing plate and an opening in the spring permitting the passage of the head engaging said spring, said head and the opening in said spring being of elongate form permitting the passage of the head in one angular position of the bolt but locking the spring in place in another angular position.

2. A brake mechanism comprising a backing plate having a radial face, a brake shoe seated against said face for radial movement thereacross from braking to release position and vice versa, said shoe having a radial web spaced from the backing plate, and means engaging said web and backing plate to resiliently hold said brake shoe against its seat on the backing plate, said resilient holding means comprising a centrally arched leaf spring the ends of which engage said brake shoe web on the side thereof remote from the backing plate, and a single securing bolt extending through an enlarged opening in the backing plate and having an enlarged head engaging the sides of said opening with a convex face on said head, the opposite end of said bolt having means engaging the central portion of the spring to hold it under tension.

3. A brake mechanism comprising a backing plate having a radial face, a brake shoe seated against said face for radial movement thereacross from braking to release position and vice versa, said shoe having a radial web spaced from the backing plate, and means engaging said web and backing plate to resiliently hold said brake shoe against its seat on the backing plate, said resilient holding means comprising a centrally arched leaf spring the ends of which engage said brake shoe web on the side thereof remote from the backing plate, and a single unitary securing bolt for said spring having an enlarged head at one end engaging one of said spring or backing plate, and a smaller head of elongate form at its opposite end engaging the other of said spring or backing plate, the smaller head passing through openings in both said spring and backing plate, but the opening in the part engaged by said smaller head permitting the passage of said head only when the head is in a definite angular position, said part being provided with a groove receiving said elongated head in another angular position of the bolt to hold the spring under tension and the parts assembled.

4. A brake mechanism comprising a backing plate having a radial face, a brake shoe seated against said face for radial movement thereacross from braking to release position and vice versa, said shoe having a radial web spaced from the backing plate, and means engaging said web and backing plate to resiliently hold said brake shoe against its seat on the backing plate, another member mounted for movement across a radial face of the backing plate and the resilient holding means comprising a central arched leaf spring having its ends engaging the side of the said shoe web remote from the backing plate and means for connecting the central portion of the spring to the backing plate to hold it under tension, said spring being provided with an extension yieldably pressing said member against said face of the backing plate.

5. A brake mechanism comprising a backing plate having a radial face, a brake shoe seated against said face for radial movement thereacross from braking to release position and vice versa, said shoe having a radial web spaced from the backing plate, and means engaging said web and backing plate to resiliently hold said brake shoe against its seat on the backing plate, an emergency brake lever mounted so as to have a part thereof move across a radial face of the backing plate, and the resilient holding means comprising an arched central leaf spring having its ends engaging the side of said brake shoe web remote from said backing plate and means for connecting the central portion of the spring to the backing plate to hold it under tension, said part extending in proximity to said spring and the spring being provided with a reverse bent extension engaging it to yieldingly press said lever against said face of the backing plate.

6. As an article of manufacture, a leaf spring for holding a brake shoe against a backing plate, comprising an arched central portion having spaced arms at each side of said central portion for engagement with the shoe, the ends of said arms being reversely bent.

7. As an article of manufacture, a leaf spring for holding a brake shoe and another member against a backing plate, comprising an arched central portion and end portions for engagement with the shoe and an extension from its central portion for engagement with the other member.

CARL CHRISTIAN HARLE.